United States Patent [19]
Kollar et al.

[11] Patent Number: 5,531,046
[45] Date of Patent: Jul. 2, 1996

[54] POWER SLIDING WINDOW ASSEMBLY

[75] Inventors: Craig A. Kollar, Rochester Hills; Donald Szerlag, Canton; William C. Lajack, Warren; Kevin Koneval, Rochester all of Mich.

[73] Assignee: General Motors Corporation, Detroit, Mich.

[21] Appl. No.: 459,042

[22] Filed: Jun. 2, 1995

[51] Int. Cl.⁶ .............................. E05F 11/48; E05F 11/53
[52] U.S. Cl. ................ 49/360; 49/362; 49/123; 49/118
[58] Field of Search .............................. 49/360, 123, 118, 49/362

[56] References Cited

U.S. PATENT DOCUMENTS

| | | |
|---|---|---|
| 1,634,954 | 7/1927 | McInerney . |
| 1,917,415 | 7/1933 | Woodruff . |
| 3,199,858 | 8/1965 | Koblensky . |
| 3,321,234 | 5/1967 | Harrell et al. . |
| 3,403,474 | 10/1968 | Spasoff . |
| 4,050,191 | 9/1995 | Azuma ........................ 49/360 |
| 4,119,341 | 10/1978 | Cook . |
| 4,177,605 | 12/1979 | Cherbourgh et al. . |
| 4,322,914 | 4/1982 | McGaughey . |
| 4,330,960 | 5/1982 | Hasemann et al. ............ 49/360 |
| 4,614,059 | 9/1986 | Trampe . |
| 4,635,398 | 1/1987 | Nakamura . |
| 4,671,013 | 6/1987 | Friese et al. . |
| 4,672,771 | 6/1987 | Lam et al. . |
| 4,674,231 | 6/1987 | Radek et al. ................... 49/360 |
| 4,793,099 | 12/1988 | Friese et al. . |
| 4,839,990 | 6/1989 | Lam et al. . |
| 4,920,698 | 5/1990 | Friese et al. . |
| 4,991,347 | 2/2991 | Takimoto et al. . |
| 4,995,195 | 2/1991 | Olberding et al. . |
| 5,146,712 | 9/1992 | Hlavaty . |

*Primary Examiner*—Kenneth J. Dorner
*Assistant Examiner*—Curtis A. Cohen
*Attorney, Agent, or Firm*—Kathryn A. Marra

[57] ABSTRACT

A power window assembly in a vehicle includes a slidable window pane mounted to the vehicle for movement in a first lateral direction to an open position and in a second lateral direction to a closed position. The power window assembly further includes first and second mounting brackets securely attached to the window pane and each having a pocket therein. The power window assembly also includes a power drive mechanism for selectively moving the window pane between the closed position and the open position. The power drive mechanism includes first and second connector arms each laterally coupled to the first and second mounting brackets, respectively. The connector arms each have an upper portion seated in the pockets of the respective mounting brackets by slip-fitted insertion therein and are vertically slidable relative the pockets to adjustably connect the window pane to the power drive mechanism. Thus, the connector arms of the power drive mechanism vertically float relative the window pane during movement of the window pane between the open position and the closed position.

19 Claims, 9 Drawing Sheets

POWER SLIDING WINDOW ASSEMBLY

This invention relates to a sliding window assembly for a vehicle and more particularly to providing powered operation of the sliding window assembly.

BACKGROUND OF THE INVENTION

It is known to have a rear window opening in a truck cab including a central opening defined between a pair of stationary window panes and to provide one or more laterally slidable window panes therebetween. The slidable window panes each typically are movable between a closed position closing the central opening and an open position opening the central opening. The slidable window panes each partially overlie one of the stationary window panes in the open position.

The slidable window panes may be moved between the open and closed positions either manually or by use a of a power drive mechanism. For example, it is known to have a reversible motor which drives a rack and pinion, cable, tape, or some combination thereof for moving the slidable window panes between the open and closed positions. However, the power drive mechanisms of the prior art have numerous shortcomings which make the power window assembly cumbersome and expensive.

For example, the power drive mechanisms of the prior art are typically positioned within or integrally connected in some manner to a frame assembly which is mounted to the vehicle body and holds the window panes. Thus, the power drive mechanism must be purchased as a cumbersome and expensive power window assembly which includes the window panes and a specially modified frame integrally assembled with the power drive mechanism. In operation, these prior art power window assemblies typically push the window in one direction and pull the window in the other direction, thus limiting the smoothness of the window movement. In addition, extra parts are required such as a track or sheath in which the flexible cable or tape rides to prevent buckling during pushing movement of the window panes between the open and closed positions.

The prior art power window assemblies also have the shortcoming of having a rigid nonadjustable connection to the slidable window panes, thus being highly sensitive to dimensional variations. To avoid this shortcoming, the prior art power drive mechanism is integrally connected to the window assembly and sold as a replacement unit for the manually movable window assembly already provided with the vehicle. However, when the power window assembly is sold as a replacement unit to alleviate dimensional concerns between the power drive mechanism and the window assembly, then other dimensional fit concerns occur between the replacement unit and the truck body. Thus, prior art power window assemblies also have the disadvantage of high repair and replacement costs. Additionally, prior art power window assemblies have many components which are complex to assemble, require numerous fasteners, and are not easily adaptable to fit different size windows or to accommodate either one or two sliding window panes.

SUMMARY OF THE INVENTION

The present invention solves the shortcomings of the prior art by providing a power drive mechanism which is independent and separate from the window assembly including the window panes and the frame such that the window assembly may be assembled directly to the vehicle body separate from the power drive mechanism. The present invention provides a power drive mechanism which may easily be added to any existing manual laterally sliding window assembly having at least one slidable pane. In addition, the power drive mechanism provides a floating adjustable connection between the power drive mechanism and the slidable window panes such that assembly of the power drive mechanism to the vehicle and attachment to the window panes is less sensitive to dimensional and positional variations. The present invention is further characterized by being easily adaptable for movement of window panes of varying widths or one or two sliding window panes. Also advantageously, the power drive mechanism of the present invention is characterized by easy snap-fitted and slip-fitted attachment of the components and reduced number fasteners for reduction in assembly costs. The present invention advantageously provides a pull/pull system which pulls the slidable window panes between the open and closed positions to provide smooth sliding movement of the slidable window panes.

These advantages are accomplished in the present invention by providing a power window assembly in a vehicle which includes a slidable window pane mounted to the vehicle for movement in a first lateral direction to an open position and in a second lateral direction to a closed position. The power window assembly further includes first and second mounting brackets securely attached to the window pane and each having a pocket therein. The power window assembly also includes a power drive mechanism for selectively moving the window pane between the closed position and the open position. The power drive mechanism includes first and second connector arms each laterally coupled to the first and second mounting brackets, respectively. The connector arms each have an upper portion seated in the pockets of the respective mounting brackets by slip-fitted insertion therein and are vertically slidable relative the pockets to adjustably connect the window pane to the power drive mechanism. Thus, the connector arms of the power drive mechanism vertically float relative the window pane during movement of the window pane between the open position and the closed position.

In accordance with another aspect of this invention, the upper portions of the first and second connector arms are each adapted to be pivotally seated in the pockets of the first and second mounting brackets, respectively, whereby the power drive mechanism is pivotally connected to the window pane. The upper portions of the first and second connector arms each preferably include a laterally extending rod-shaped portion pivotally seated in the pockets of the mounting brackets to pivotally connect the first and second connector arms to the window pane whereby the power drive mechanism is pivotally connected to the window pane.

The present invention advantageously provides a pull/pull system for moving the window panes. The power drive mechanism is adapted to selectively pull one of the connector arms in the first lateral direction for pulling the window pane towards the open position and pull the other of the connector arms in the second lateral direction for pulling the window pane towards the closed position.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
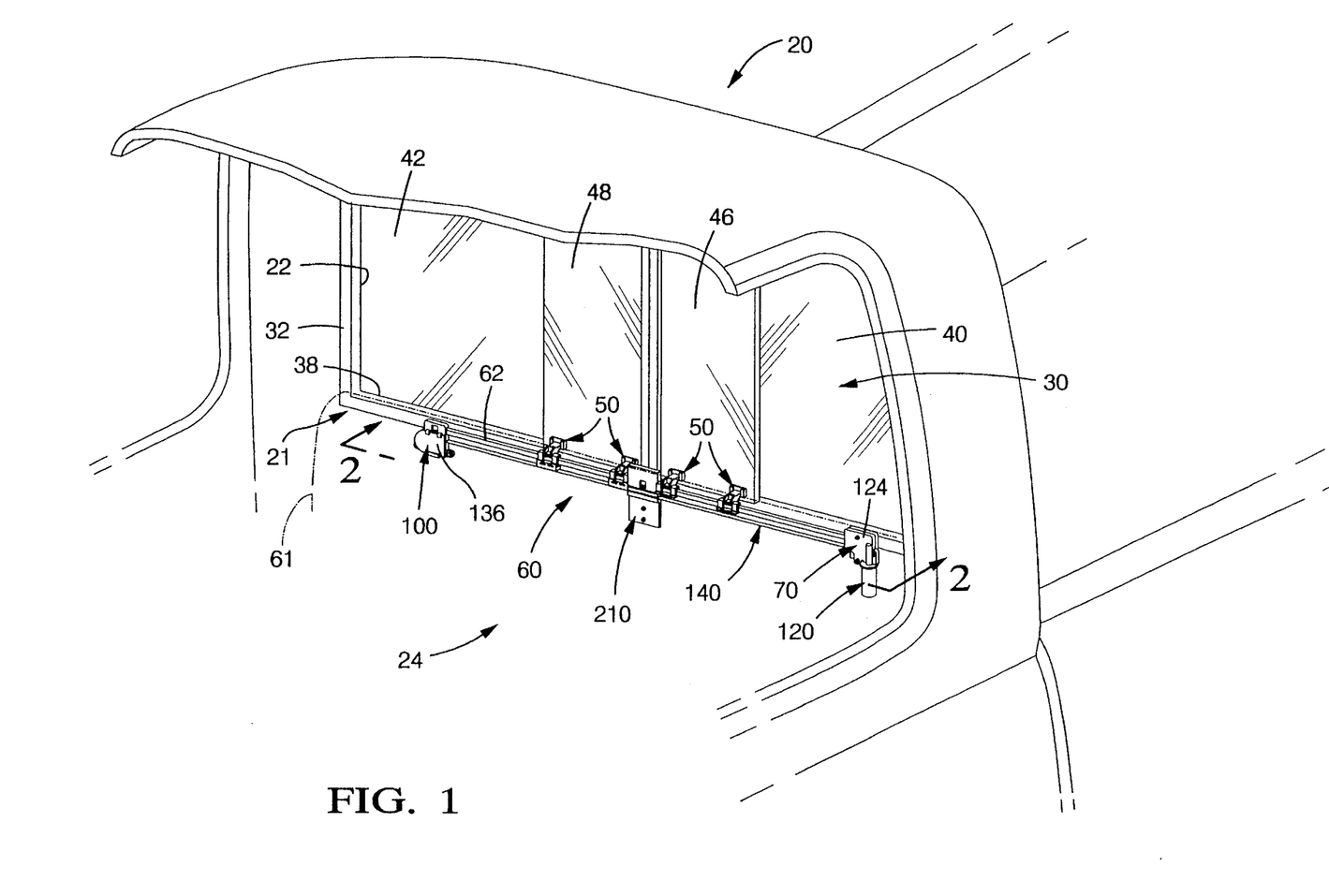
FIG. 1 is a frontal perspective view of a vehicle partially-broken-away and having a power window assembly including a window assembly and a power drive mechanism for moving the window assembly.
Figure 2:
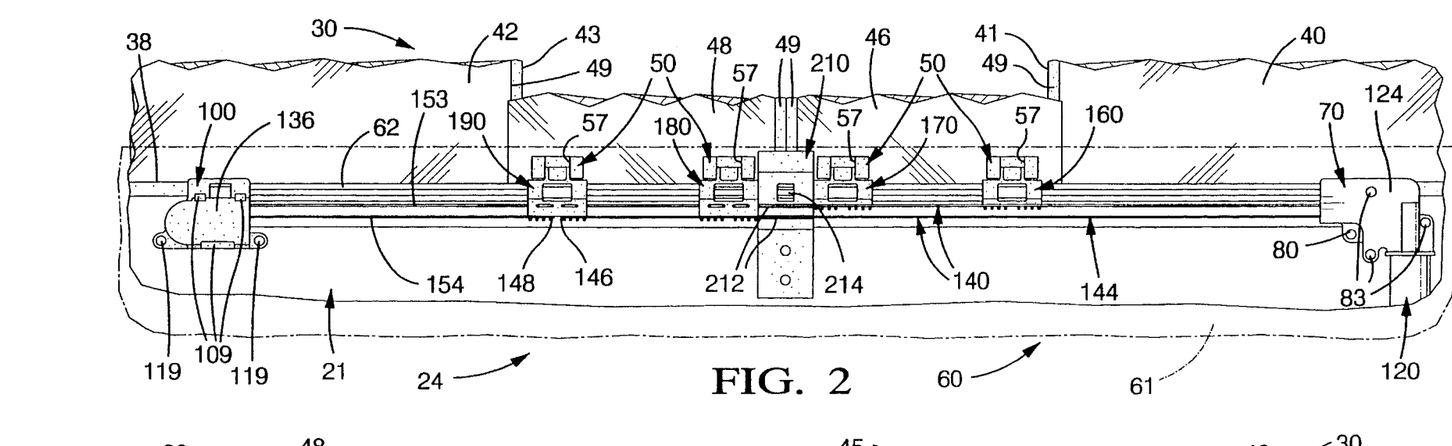
FIG. 2 is a view taken along line 2—2 of FIG. 1 and showing a front view of the power drive mechanism and the window assembly in the closed position and partially-broken-away.
Figure 3:
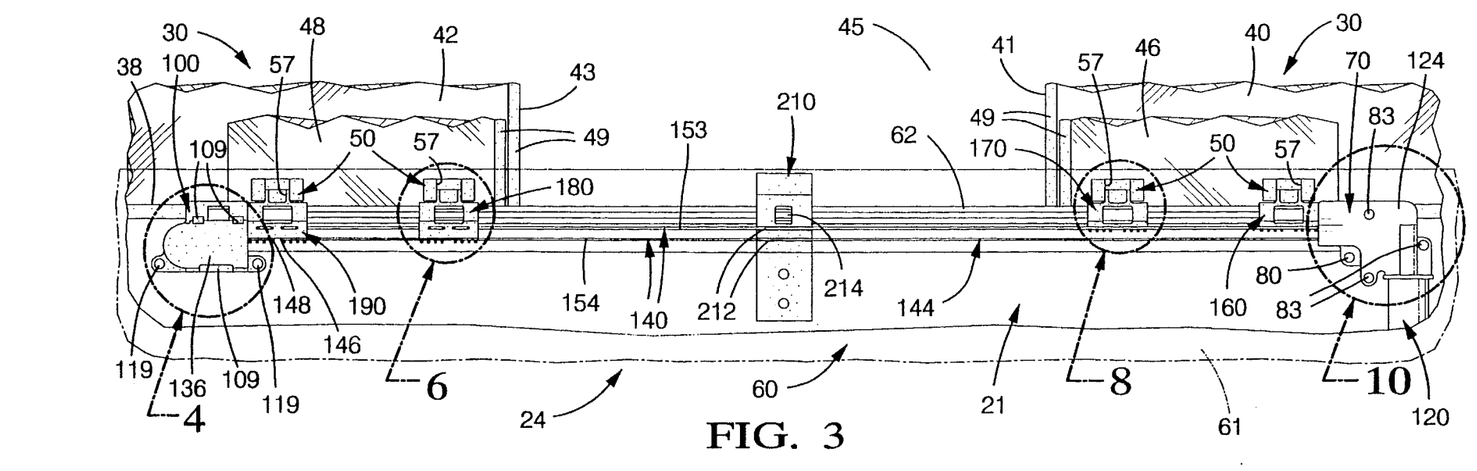
FIG. 3 is a view similar to FIG. 2, but showing the window assembly in the open position.
Figure 7:
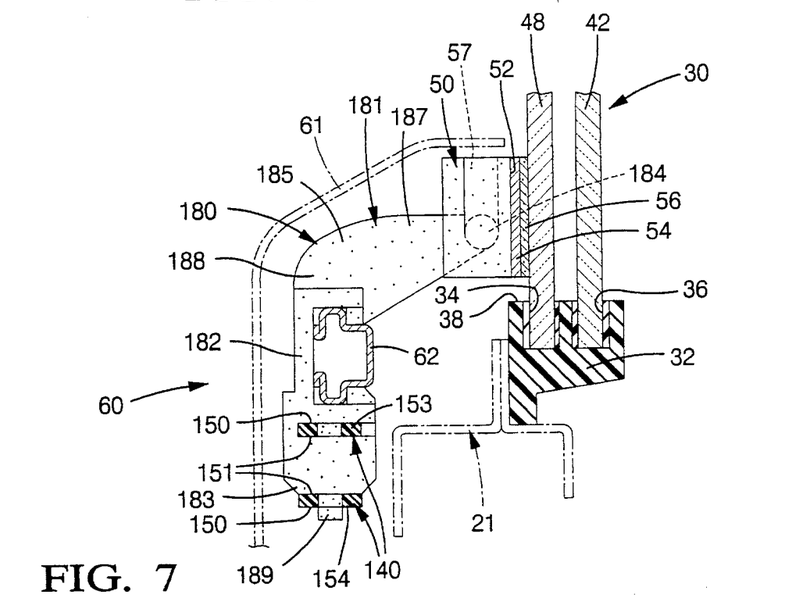
FIG. 7 is a view taken along line 7—7 of FIG. 6.
Figure 8:
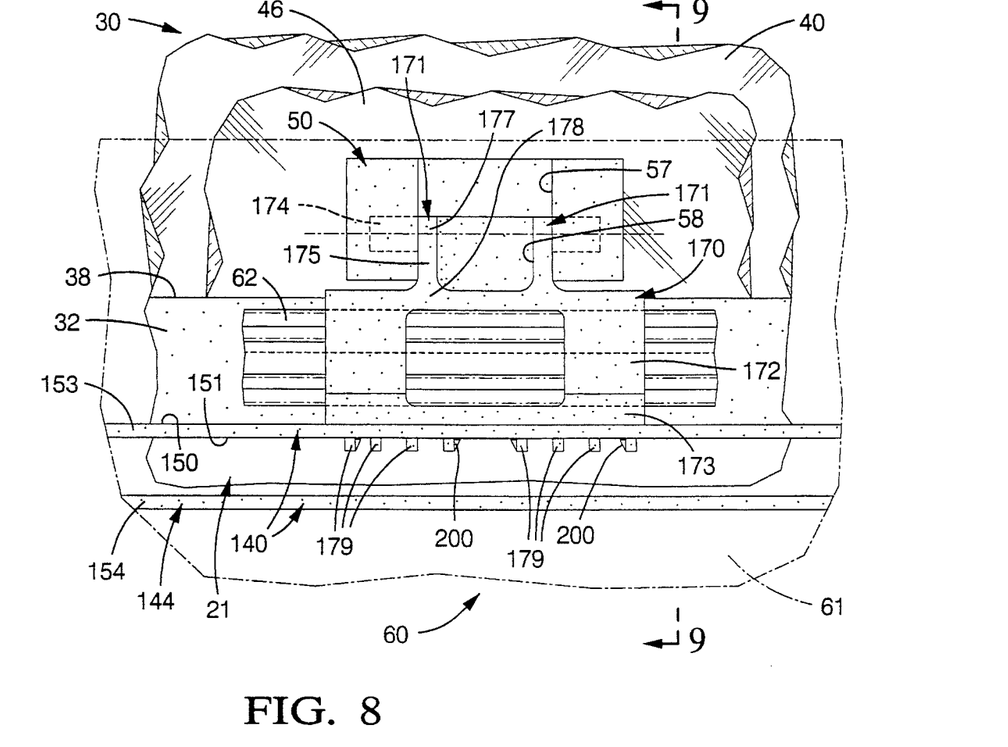
FIG. 8 is an enlargement of the encircled portion as indicated at 8 in FIG. 3 and showing an upper connector arm.
Figure 9:
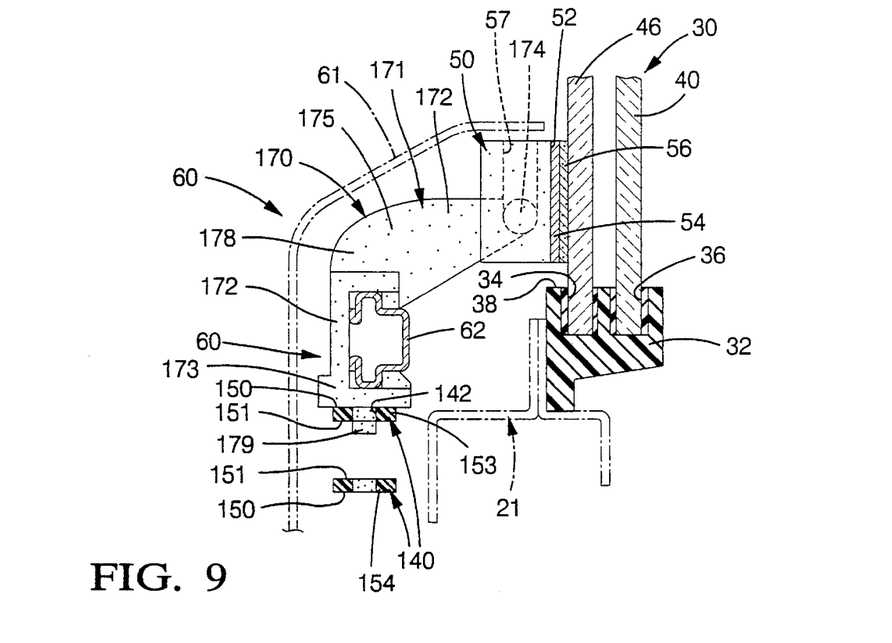
FIG. 9 is a view taken along line 9—9 of FIG. 8.

Referring to FIG. 1, a vehicle 20 includes a trapezoidal-shaped window opening 22 suitably formed by sheet metal vehicle structure 21. A power window assembly 24 includes a window assembly 30 and a power drive mechanism 60 adjustably connected to the window assembly 30, as described in detail hereinafter. The window assembly 30 includes a conventional frame 32 suitably mounted in the window opening 22 and having an inboard channel 34 and an outboard channel 36 formed on a lower edge 38 of the frame 32 as best shown in FIGS. 7 and 9. Referring to FIG. 2, the window assembly 30 includes first and second spaced apart stationary window panes 40, 42 permanently mounted in the outboard channel 36 and at opposite sides of the window opening 22. Each of the stationary window panes 40, 42 includes a vertically extending free edge 41, 43 which does not engage the frame 32. As best shown in FIGS. 1 and 3, the free edges 41, 43 of the stationary window panes 40, 42 and an upper edge (not shown) and the lower edge 38 of the frame 32 cooperatively define a central window opening 45.

First and second slidable window panes 46, 48 are conventionally slidably mounted in the inboard channel 34 on the frame 32 for lateral movement between a closed position completely covering the central window opening 45 as shown in FIG. 2 and an open position in which the first and second slidable window panes 46, 48 each overlie at least a portion of the first and second stationary window panes 40, 42, respectively, as shown in FIG. 3. It will be appreciated that the window panes 40, 42, 46, 48 and the frame 32 are preferably the original equipment as provided with the vehicle 20 for manual operation. The stationary and slidable window panes 40, 42, 46, 48 may carry suitable seals 49 thereon for weather protection.

Referring to FIGS. 6–9, the window assembly 30 includes mounting brackets 50 each preferably molded from a polymeric material and including a rear face 52 preferably formed by a planar metal insert 54 integrally molded with the mounting bracket 50. As shown in FIGS. 2 and 3, two mounting brackets 50 are rigidly mounted on each of the first and second slidable window panes 46, 48 and located proximate opposite lateral sides of the slidable window panes 46, 48 and near the lower edge 38 of the frame 32. The rear face 52 of the mounting brackets 50 are each preferably adhesively bonded to the slidable window panes 46, 48, such as by an adhesive material 56. Thus, the mounting brackets 50 are not movable relative the slidable window panes 46, 48 when mounted thereto. The mounting brackets 50 each include an upwardly opening pocket 57 having a U-shaped forward opening 58. The mounting brackets 50 are coupled to the power drive mechanism 60 for lateral movement in unison therewith, as described further hereinafter.

The power drive mechanism 60 provides powered operation of the window assembly 30. The power drive mechanism 60 may advantageously be used with any existing standard vehicle window assembly 30 having slidable window panes 46, 48 with two mounting brackets 50 attached to each of the sliding window panes 46, 48. The power drive mechanism 60 is assembled completely independently and separately from the window assembly 30 and can later be easily attached thereto at the vehicle 20 assembly location. The power drive mechanism 60 is mounted to the vehicle structure 21 at a location beneath and longitudinally offset in a forward direction from the window assembly 30 and is disposed entirely outside the window frame 32. The power drive mechanism 60 is adjustably connected to the window assembly 30 as described further hereinafter.

Referring to FIGS. 1–10, the power drive mechanism 60 includes the component parts of a channel member 62 extending between first and second housing members, 70, 100, a first gear 90 rotatably supported on the first housing member 70 and driven by an electric motor 120, a length of tape 140 having a plurality of slots 142 therein and formed into a loop 144 and coupling the first gear 90 to a second gear 110 supported in the second housing member 100, and floating connector arms 160, 170, 180, 190 for adjustably connecting and laterally coupling the tape 140 of the power drive mechanism 60 to the mounting brackets 50 of the window assembly 30.

Figure 5:
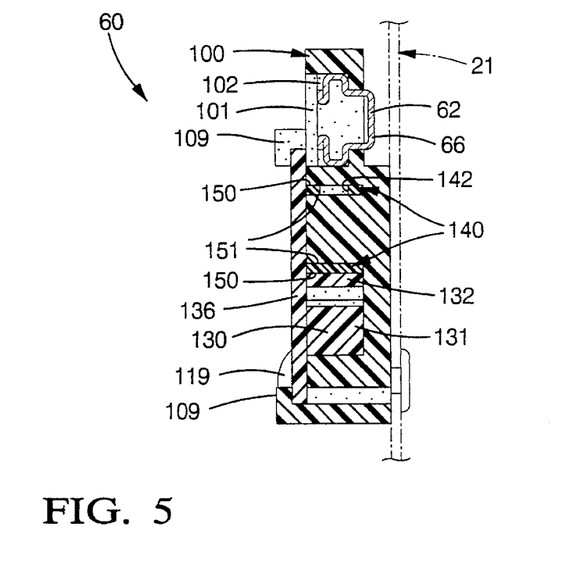
FIG. 5 is a sectional view taken along line 5—5 of FIG. 4.
Figure 10:
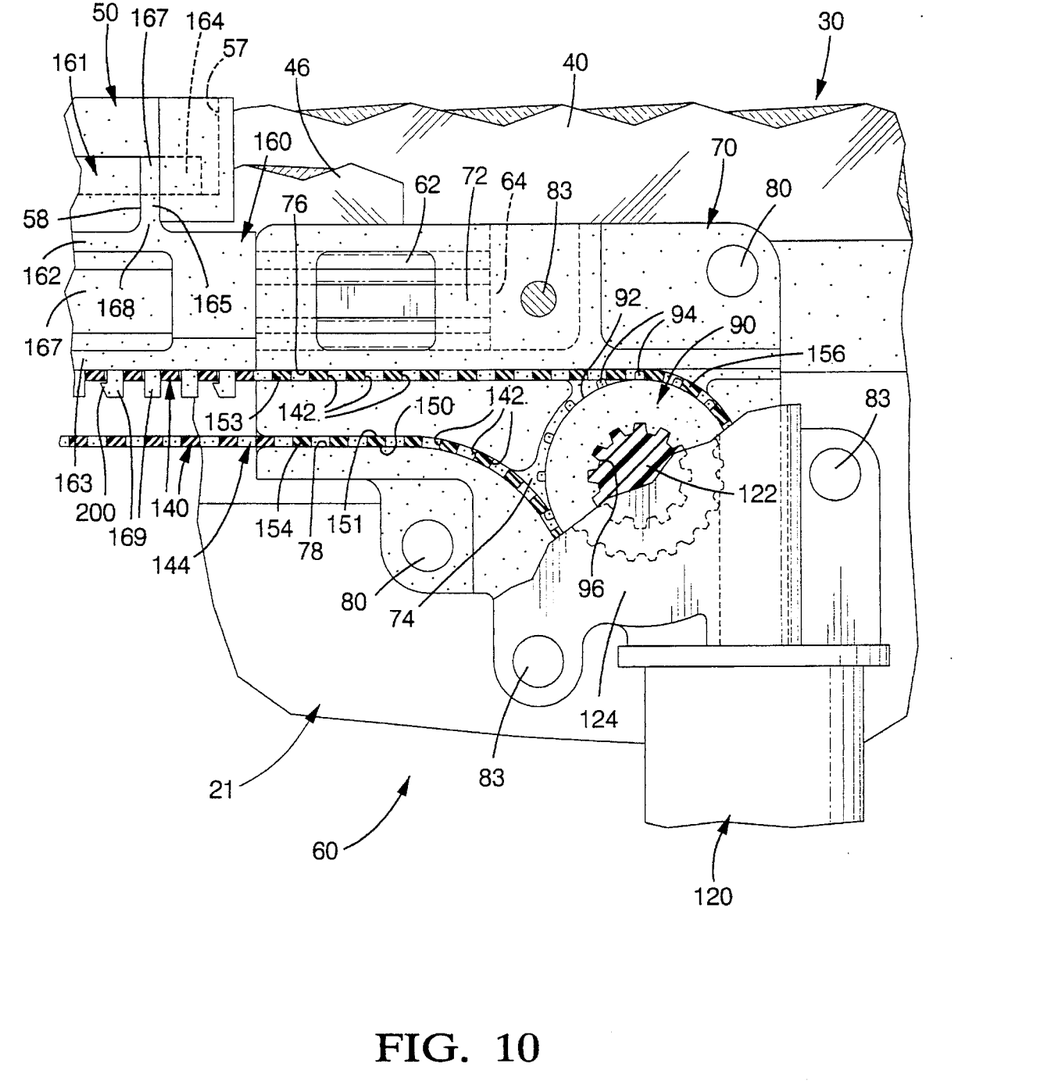
FIG. 10 is an enlargement of the encircled portion as indicated at 10 in FIG. 3 and showing a first housing member and a partially-broken-away electric motor.

Referring to FIGS. 2 and 7, the laterally elongated channel member 62 is preferably formed of rolled steel and offset longitudinally forward from the window panes 40, 42, 46, 48 when the power drive mechanism 60 is mounted to the vehicle structure 21. The channel member 62 is laterally disposed and preferably has a lateral length greater than the combined lateral lengths of the slidable window panes 46, 48 such that the channel member 62 laterally extends from beneath the first stationary window pane 40 to beneath the second stationary window pane 42. Referring to FIGS. 5 and 10, the channel member 62 includes a first end 64 spaced beneath the first stationary window pane 40 and an opposite second end 66 spaced beneath the second stationary window 42. The channel member 62 preferably has a continuously extending constant hat-shaped cross-section as best shown in FIGS. 7 and 9.

Referring to FIG. 10, the first housing member 70 is preferably integrally molded from a plastic material and includes a laterally extending first channelled portion 72 matably shaped for receiving the first end 64 of the channel member 62 therein by slip-fitted lateral insertion. The first housing member 70 is mounted to the vehicle structure 21 at a location beneath the first stationary window pane 40 and offset longitudinally forward from the window assembly 30. The first housing member 70 further includes a forwardly opening circular first cavity 74 formed therein for rotatably supporting the first gear 90 therein. The first gear 90 is preferably molded from a plastic material and includes an outer surface 92 having outwardly projecting first gear teeth 94 circumferentially spaced equally apart and adapted for engaging the slots 142 on the tape 140 for driving the tape 140, as described further hereinafter. The first gear 90 includes a serrated inner surface 96.

Forwardly opening upper and lower laterally elongated first guide slots 76, 78 for guiding the tape 140 are formed in the first housing member 70 and vertically aligned beneath the first channelled portion 72. The upper and lower first guide slots 76, 78 each have a longitudinal depth approximately equal to a width of the tape 140 for closely receiving the tape 140 therein. The upper and lower first guide slots 76, 78 each laterally extend through to the first cavity 74 of the first housing member 70. The first housing member 70 also includes apertures (not shown) for receiving first mounting fasteners 80, such as rivets, for securing the first housing member 70 to the vehicle structure 21. The first housing member 70 further includes apertures (not shown) for receiving motor fasteners 83, such as rivets, to mount the electric motor 120 to the first housing member 70.

Figure 4:
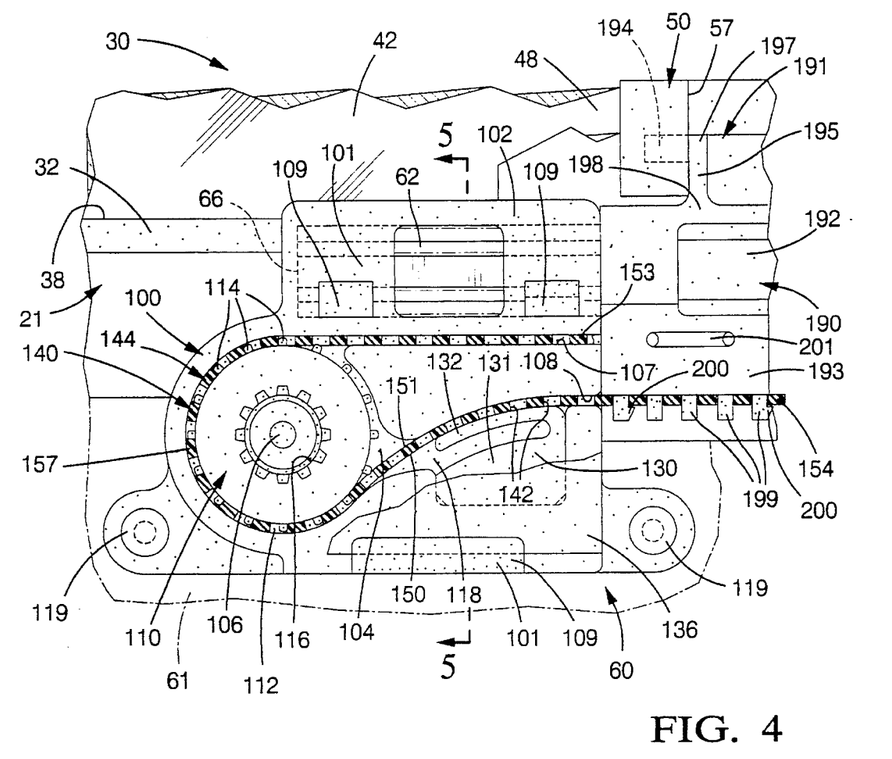
FIG. 4 is an enlargement of the encircled portion as indicated at 4 in FIG. 3 and showing a second housing member and a partially-broken-away housing cover.

Referring to FIGS. 4 and 5, the second housing member 100 is preferably integrally molded from a plastic material and includes a laterally extending second channelled portion 102 matably shaped for receiving the second end 66 of the channel member 62 therein by slip-fitted lateral insertion. The second housing member 100 further includes a forwardly opening circular second cavity 104 formed therein for rotatably supporting the second gear 110 therein on a circular post 106. The second gear 110 is preferably integrally molded from a plastic material and includes an outer surface 112 having outwardly projecting second gear teeth 114 equally circumferentially spaced for engaging the slots 142 on the tape 140. A serrated inner surface 116 of the second gear 110 freely rotates about the circular post 106 formed in the second cavity 104. While the second gear 110 has the serrated inner surface 116 to be interchangeable with the first gear 90, the inner surface 116 could also be smooth.

Forwardly opening upper and lower laterally elongated second guide slots 107, 108 are formed in the second housing member 100 and are vertically aligned beneath the second channelled portion 102. The upper and lower second guide slots 107, 108 each have a longitudinal depth approximately equal to the width of the tape 140 and are sized for closely receiving the tape 140 therein. The second housing member 100 also preferably includes a forwardly opening tensioner cavity 118 shaped for closely receiving a tensioner member 130 therein, described further hereinafter. The second hi, using member 100 includes apertures (not shown) for receiving second mounting fasteners 119 therein, such as rivets, for securing the second housing member 100 to the vehicle structure 21 at a location offset longitudinally forward from the window assembly 30. A plurality of integral tabs 109 are preferably included on a forward face 101 of the second housing member 100 for holding a housing cover 136 in position on the second housing member 100.

As best shown in FIGS. 4 and 5, the tensioner member 130 is preferably integrally molded of a plastic material and is seated in the tensioner cavity 118 of the second housing member 100. The tensioner member 130 includes a lower body portion 131 and a flexible upper tongue 132 which flexibly engages and is upwardly biased against the tape 140 to maintain tension on the tape 140 and prevent slack in the tape 140 to ensure smooth movement of the slidable window panes 46, 48 between the open and closed positions, as described further hereinafter.

Referring to FIGS. 2 and 3, the housing cover 136 is generally planar and integrally molded from a plastic material. The housing cover 136 is adapted for slip-fitted lateral insertion beneath the tabs 109 on the second housing member 100. The housing cover 136 traps the second gear 110, tensioner member 130, and tape 140 within the second housing member 100 when mounted thereto.

A reversible electric motor 120 is mounted to the first housing member 70 by the plurality of motor fasteners 83, such as rivets, as best shown in FIG. 10. A serrated shaft 122 is connected to the motor 120 and extends outwardly therefrom in a rearward direction. The shaft 122 of the motor 120 engages and is rotatively coupled to the serrated inner surface 96 of the first gear 90. The electric motor 120 selectively rotates the first gear 90 in clockwise and counterclockwise directions. A suitable casing 124 encloses the motor 120 as best shown in FIG. 10. Attachment of the motor 120 to the first housing member 70 traps the first gear 90 and tape 140 within the first housing member 70, as described further below.

Referring to FIG. 2, the length of tape 140 is preferably made of a polyester elastomer, such as "DYMETROL" by Dupont or a similar material. The length of tape 140 is formed into a generally continuous tape loop 144 by snap-fitted connection of a first end 146 and a second end 148 of the tape 140 onto the connector arm 180 of the power drive mechanism 60, as described further hereinafter. As best shown in FIG. 10, the plurality of slots 142 on the tape 140 are adapted for engaging and being driven by the first gear teeth 94 on the first gear 90, thus rotatively coupling the tape loop 144 to the motor 120 for movement of the tape loop 144 in the clockwise and counterclockwise directions. As best shown in FIG. 4, the second gear teeth 114 on the second gear 110 also matably engage the slots 142 of the tape 140 such that the second gear 110 is rotatively coupled to the tape 140. The tape loop 144 includes an outer race 150 and an inner race 151 each extending around the length of tape loop 144. The tape loop 144 further includes a laterally extending upper length 153 and a laterally extending lower length 154 being parallel to and vertically spaced apart directly below the upper length 153. As best shown in FIGS. 5 and 10, the tape loop 144 further includes first and second opposing U-shaped lateral ends 156, 157 engaging the first and second gears 90, 110, respectively, and interconnecting the upper length 153 and the lower length 154 of the tape loop 144. The tape loop 144 has a tape width which is oriented perpendicular to the vertically extending window panes 40, 42, 46, 48 when the power drive mechanism 60 is mounted to the vehicle structure 21. The upper and lower lengths 153, 154 of the tape loop 144 extend parallel to and are vertically aligned beneath the channel member 62. The tape loop 144 laterally extends between the first and second housing members 70, 100 and is routed through the upper and lower first guide slots, 76, 78 around the first gear 90 in the first cavity 74, through the upper and lower second guide slots, 107, 108 around the second gear 110 in the second cavity 104, and over the tensioner member 130 in the tensioner cavity 118. Advantageously, the assembled tape loop 144 is tightly drawn around the first and second gears 90, 110 and thus is constantly maintained in tension such that the tape loop 144 holds together the power drive mechanism 60 as a single assembly prior to attachment to the vehicle structure 21 and enables smooth pull/pull operation of the window assembly 30, as described further hereinafter.

Referring to FIGS. 2 and 3, the first and second upper connector arms 160, 170 operatively connect the upper length 153 of the tape loop 144 to the first slidable window pane 46 and the first and second lower connector arms 180, 190 operatively connect the lower length 154 of tape loop 144 to the second slidable window pane 48. It is essential that at least two connector arms 160, 170, 180, 190 are connected to each of the first and second slidable window panes 46, 48 to enable pull/pull movement of the window assembly 30 between the open and closed positions, as described further hereinafter. The first and second upper connector arms 160, 170 preferably are interchangeable and the first and second lower connector arms 180, 190 are preferably interchangeable. The upper and lower connector arms 160, 170, 180, 190 are each preferably a single integral part molded from a plastic material. The first and second upper connector arms 160, 170 are each operatively connected to opposite lateral sides of the first slidable window pane 46 near the lower edge 38 of the frame 32 and the first and second lower connector arms 180, 190 are each operatively connected to opposite lateral sides of the second slidable window pane 48 near the lower edge 38 of the frame 32.

Referring to FIGS. 4 and 6–10, the upper and lower connector arms 160, 170, 180, 190 each include a generally T-shaped upper portion 161, 171, 181, 191 adjustably connected to respective mounting brackets 50, a central grooved portion 162, 172, 182, 192 for slidably engaging the channel member 62 therein, and a lower end portion 163, 173, 183, 193 adapted for engagement with the slots 142 on the tape loop 1.44. The generally T-shaped upper portions 161, 171,181,191 of the connector arms 160, 170, 180, 190 each include a laterally extending rod-shaped upper end portion 164, 174, 184, 194 and a downwardly and longitudinally forwardly extending neck portion 165, 175, 185, 195. The rod-shaped upper end portions 164, 174, 184, 194 extend laterally outward from the neck portions 165, 175, 185, 195 and are integrally connected at their centers to upper ends 167, 177, 187, 197 of the neck portions 165, 175, 185, 195. The neck portions 165, 175, 185, 195 have lateral dimensions sized for closely extending through the forward opening 58 of the upwardly opening pockets 57 in the mounting brackets 50 such that the mounting brackets 50 are laterally coupled to the connector arms 160, 170, 180, 190 for lateral movement in unison therewith.

As best shown in FIGS. 4 and 6–10 the rod-shaped upper end portions 164, 174, 184, 194 are seated in the pockets 57 of the mounting brackets 50 and are vertically slidable relative to the mounting brackets 50. Each of the upper end portions 164, 174, 184, 194 are adapted for pivotal rotation about a laterally extending pivot axis A of the rod-shaped upper end portions 164, 174, 184, 194 such that the connector arms 160, 170, 180, 190 are vertically slidable relative the mounting brackets 50 and pivotally connected thereto to provide a vertically adjustable and pivotal attachment between the window assembly 30 and the power drive mechanism 60.

The grooved portions 162, 172, 182, 192 of the connector arms 160, 170, 180, 190 each depend downwardly from respective lower ends 168, 178, 188, 198 of the neck portions 165, 175, 185, 195, are laterally extending and are shaped for slidably receiving the channel member 62 therein such that the connector arms 160, 170, 180, 190 are slidably connected to the channel member 62 and are easily laterally slidable relative the channel member 62 when engaged therewith. The lower end portions 163, 173, 183, 193 of the connector arms 160, 170, 180, 190 are aligned below the corresponding grooved portions 162, 172, 182, 192. The lower end portions 163, 173, 183, 193 each include vertically downwardly extending teeth 169, 179, 189, 199 adapted for engaging the slots 142 in the tape 140. Preferably, teeth 169, 179, 189, 199 on each of the connector arms 160, 170, 180, 190 selectively include undercut barbed portions 200 for trapping the tape 140 on the teeth 169, 179, 189, 199.

Figure 6:
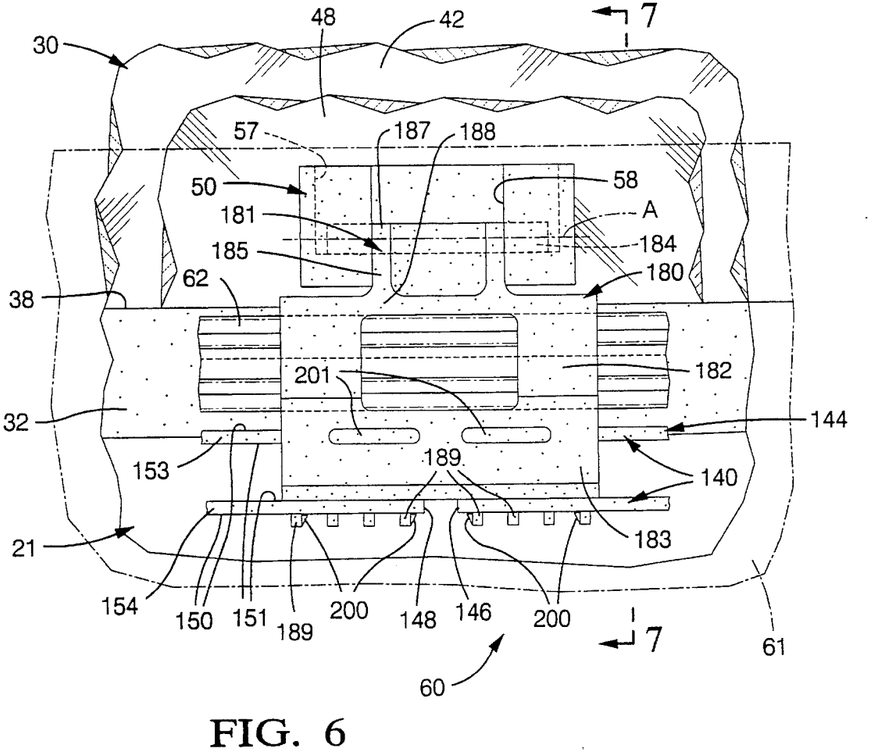
FIG. 6 is an enlargement of the encircled portion as indicated at 6 in FIG. 3 and showing a lower connector arm.

In addition to the components of the connector arms 160, 170, 180, 190 described above, the lower connector arms 180, 190 each include a laterally extending pass slot 201 interposed between the grooved portions 182, 192 and the lower end portions 183, 193 as best shown in FIG. 6. The pass slots 201 extend entirely through the lower connector arms 180, 190 and are sized for slidably engaging the upper length 153 of the tape loop 144 therein such that the pass slots 201 provide guidance and support for the upper length 153 of the tape loop 144. Advantageously, the laterally extending pass slots 201 permit the tape loop 144 to be vertically arranged such that the upper length 153 of the tape loop 144 is positioned directly above and parallel to the lower length 154 such that the width of the tape 140 is oriented normal to the vertically extending window panes 40, 42, 46, 48. Thus, the lower connector arms 180, 190 are advantageously engageable with the lower length 154 of the tape loop 144 to pull open and closed the second slidable window pane 48, without interfering with the movement of the upper length 153 of the tape loop 144 as enabled by the pass slots 201. Advantageously, the vertically aligned tape loop 144 arrangement permits the power drive mechanism 60 to be packaged in a longitudinally narrow space, such as behind a seat or in a wall of a vehicle 20.

If desired, a central support arm 210 may be mounted to the vehicle structure 21 as best shown in FIGS. 2 and 3. When using the power drive mechanism 60 with a laterally wide window assembly 30, the upper and lower lengths 153, 154 of the tape loop 144 may be routed through upper and lower pass slots 212 in the central support arm 210 to assist with guidance and support of the tape loop 144. The central support arm 210 preferably includes a grooved portion 214 through which the channel member 62 extends and is supported. In addition, the power drive mechanism 60 may include a molded plastic trim cover 61, best shown in phantom lines in FIGS. 1, 7 and 9, which may be used to cover the entire power drive mechanism 60 from view and is mounted to the vehicle structure 21 after mounting the power drive mechanism 60.

The power window assembly 24 is cooperatively provided by connection of the window assembly 30 and the power drive mechanism 60 which are each separately and independently assembled apart from the vehicle 20. The power window assembly 24 is provided by mounting the window assembly 30 to the window opening 22 in the vehicle 20, connecting the power drive mechanism 60 to the window assembly 30, ,and mounting the power drive mechanism 60 to the vehicle structure 21.

As best shown in FIGS. 7 and 9, the window assembly 30 is preferably assembled as follows. The first and second stationary window panes 40, 42 are conventionally mounted in the outboard channel 36 of the standard frame 32 and the first and second slidable window panes 46, 48 are conventionally mounted in the inboard channel 34 of the standard frame 32. Next, two mounting brackets 50 are fixedly attached to the first slidable window pane 46 and two mounting brackets 50 are fixedly attached to the second slidable window pane 48. More specifically, the rear faces 52 of the mounting brackets 50 being the metal inserts 54, preferably being aluminum, are each preferably adhesively bonded to the corresponding slidable window panes 46, 48 as best illustrated in FIGS. 7 and 9. The aluminum metal inserts 54 are preferred over plastic due to their superior bonding properties. The placement of the mounting brackets 50 on the slidable window panes 46, 48 may be assisted by an alignment template (not shown). Thus, the manually operable window assembly 30 including the window panes 40, 42, 46, 48 and frame 32 as originally provided with the vehicle 20 is advantageously the same window assembly 30 used for the power window assembly 24 with the simple addition of the mounting brackets 50.

While numerous variations are possible, the power drive mechanism 60 is preferably assembled as follows. Preferably the first gear 90 is dropped rearwardly into the first cavity 74 of the first housing member 70 and is rotatably supported therein. Next, the serrated shaft 122 of the motor 120 is matably aligned with the serrated inner surface 96 of the first gear 90 and pushed rearwardly therein and the motor 120 and casing 124 is secured to the first housing member 70 by the motor fasteners 83, such as rivets. The motor 120 acts as a cover which traps the first gear 90 in the first cavity 74.

Next, the first and second upper connector arms 160, 170, the central support arm 210, and the first and second lower connector arms 180, 190 are each pushed onto the channel member 62 and approximately spaced as shown in FIG. 2. Thus, the channel member 62 is successively slip-fittedly inserted through the grooved portions 162, 172, 182, 192 of the first and second upper connector arms 160, 170, and the first and second lower connector arms 170, 180, respectively, such that the connector arms 160, 170 180, 190 are laterally slidable relative the channel member 62. Next, the first and second housing members 70, 100 are pushed onto the first and second ends 64, 66 of the channel member 62, respectively. Thus, the channel member 62 now laterally extends between and connects the first housing member 70 and the second housing member 100.

The length of tape 140 is preferably previously cut to the appropriate length being somewhat greater than twice the lateral length of the channel member 62. Preferably, the second end 148 of the tape 140 is pushed into the lower first guide slot 78 on the first housing member 70 such that the slots 142 near the second end 148 of the tape 140 engage the first gear teeth 94 on the first gear 90. Next, power is supplied to the motor 120 such that the motor 120 rotates the first gear 90 in the counterclockwise direction. The first gear teeth 94 on the first gear 90 successively engage the slots 142 on the tape 140 and thread the tape 140 around the first gear 90 and out through the upper first guide slot 76 in the first housing member 70. The rotating motor 120 continues to feed the tape 140 in the leftwardly direction past the first and second upper connector arms 160, 170. The second end 148 of the tape 140 is then successively threaded through the pass slots 212, 201 on the central support arm 210 and second and first lower connector arms 180, 190.

Next, the second gear 110 is pushed rearwardly into the second cavity 104 on the second housing member 100 and is freely rotatably supported therein by the circular post 106.

The second end 148 of the tape 140 continues to be fed leftwardly by the first gear 90 and is then inserted through the upper second guide slot 107 of the second housing member 100 and threaded around the second gear 110 such that the tape 140 engages the second gear teeth 114 on the second gear 110. The tape 140 continues to be fed around the second gear 110 and out through the lower second guide slot 108 of the second housing member 100 until the second end 148 of the tape 140 is aligned approximately beneath the left half of the first lower connector arm 180. Next, the first end 146 of the tape 140 is threaded through the lower pass slot 212 on the central support arm 210 and the first end 146 of the tape 140 is aligned beneath the right side of the first lower connector arm 180. As best shown in FIG. 6, the slots 142 on the first end 146 of the tape 140 are snapped onto the corresponding downwardly depending teeth 189 on the right side of the first lower connector arm 180 and the slots 142 on the second end 148 of the tape 140 are snapped onto the downwardly depending teeth 189 on the left side of the first lower connector arm 180. The barbed portions 200 on the downwardly depending teeth 189 prevent release of the tape 140 from the first lower connector arm 180. Thus, attachment of the first and second ends 146, 148 of the tape 140 to the first lower connector arm 180 forms the tape 140 into a generally continuous tape loop 144. Thus, the upper length 153 of the tape 140 is positioned directly vertically above the lower length 154 of the tape 140 and first and second opposite lateral ends 156, 157 of the tape engage the first and second gears 90, 110, respectively. It will be appreciated that in the assembled condition the tape 140 is drawn taught and continually in tension.

Next, the tensioner member 130 is pushed rearwardly into the tensioner cavity 118 on the second housing member 100 such that lower length 154 of tape 140 is now routed over the tongue 132 of the tensioner member 130. The tongue 132 of the tensioner member 130 is upwardly biased against the outer race 150 of the lower length 154 of the tape 140 and removes any slight amount of slack that may be present in the tape 140 after assembly to the first and second housing members 70, 100. At this time the housing cover 136 is assembled to the second housing member 100 simply by slip-fitted insertion in a rightwardly direction beneath the tabs 109 on the second housing member 100. When the housing cover 136 is assembled to the second housing member 100, the housing cover 136 traps the tensioner member 130 in the tensioner cavity 118, traps the second gear 110 in the second cavity 104 and traps the tape 140 in the upper and lower second guide slots 107, 108. It will further be appreciated that the motor 120 and motor casing 124 serve a similar function on the first housing member 70 by trapping the first gear 90 in the first cavity 74 and by trapping the tape 140 in the upper and lower first guide slots 76, 78.

Next, a fixture or template may be used to laterally align the connector arms 160, 170, 180, 190 on the channel member 62 in position corresponding to the closed position of the window assembly 30 as shown in FIG. 2. Assembly of the power drive mechanism 60 is completed by snapping the lower end portions 163, 173 of the upper connector arms 160, 170 onto the outer race 150 of the upper length 153 of the tape loop 144 and snapping the lower end portion 193 of the second lower connector arm 190 onto the inner race 151 of the lower length 154 of the tape loop 144.

Thus, it will be appreciated that the finally assembled tape loop 144 securely connects the components of the power drive mechanism 60 together such that the power drive mechanism 60 is sufficiently sturdy to transport to the vehicle 20 assembly location. It will further be appreciated that the power drive mechanism 60 is assembled as a completely separate and independent unit from the window assembly 30.

The power window assembly 24 is completed at the vehicle 20 assembly location as follows. The window assembly 30 is installed in the window opening 22 of the vehicle 20 in a suitable manner as is well-known in the art. Next, the rod-shaped upper end portions 164, 174, 184, 194 of the connector arms 160, 170, 180, 190 are each aligned above the respective mounting brackets 50 on the window assembly 30. The upper end portions 164, 174, 184, 194 of the upper portions 161,171,181,191 are slip-fittedly inserted into the pockets 57 of the mounting brackets 50 such that the rod-shaped tipper end portions 164, 174, 184, 194 are seated in the pockets 57 and the neck portions 165, 175, 185, 195 of the connector arms 160, 170, 180, 190 extend forwardly and downwardly out through the forward openings 58 of the pockets 57. The upper end portions 164, 174, 184, 194 of the connector arms 160, 170, 180, 190 are each vertically slidable relative to the mounting brackets 50 and are pivotally connected to the mounting brackets 50 for pivotal movement about laterally extending pivot axes A. Thus, the entire power drive mechanism 60 is now suspended from the window assembly 30 by the connector arms 160, 170, 180, 190.

It will be appreciated that since the connector arms 160, 170, 180, 190 are pivotally connected to the slidable window panes 46, 48 and are vertically slidable relative thereto, the entire power drive mechanism 60 may be longitudinally and vertically adjusted for easily aligning the mounting apertures (not shown) in the first and second housing members 70, 100 with mounting holes (not shown) provided on the vehicle structure 21. Thus, any dimensional variations between the power drive mechanism 60 and the vehicle 20 are accommodated by the adjustable connection between the power drive mechanism 60 and the window assembly 30. Next, the first and second mounting fasteners, 80, 119, such as rivets, are driven through the first and second housing members, 70, 100, respectively, to mount the power drive mechanism 60 to the vehicle structure 21. Connection of the first and second housing members 70, 100 to the vehicle structure 21 in combination with the tension on the tape loop 144 now prevents inadvertent vertical upward removal of the connector arms 160, 170, 180, 190 from the mounting brackets 50.

Advantageously, the power drive mechanism 60 has absolutely no connection to the frame 32 of the window assembly 30 and is assembled as a unit completely independent and separate from the window assembly 30. It will be appreciated that the connector arms 160, 170, 180, 190 provide an adjustable floating connection between the tape 140 and the slidable window panes 46, 48 to enable easy alignment of the power drive mechanism 60 relative the vehicle 20 and window assembly 30 in the vertical and longitudinal directions as enabled by the rod-shaped upper end portions 164, 174, 184, 194 seated in the pockets 57 of the mounting brackets 50.

Referring to FIGS. 2 and 3, the power drive mechanism 60 pulls open and pulls closed the first and second slidable window panes 46, 48 as follows. To open the movable window panes 46, 48, the operator pushes a switch in the cab, not shown, which is connected to the reversible electric motor 120 and the electric motor 120 drives the first gear 90 in a clockwise direction. The first gear 90 which is engaging the tape 140 pulls the upper length 153 of the tape loop 144 away from the first slidable window pane 46. The teeth 169 extending from the first upper connector arms 160 and engaging the tape 140 causes the laterally coupled respective mounting bracket 50 to slide to the right and to pull the first movable window pane 46 from the closed position shown in FIG. 2 to the open position shown in FIG. 3. Simultaneously, the second gear 110 is rotated in a clockwise direction by the pulling of the upper length 153 of the tape loop 144 engaged with the second gear 110. The second gear 110 and upper length 153 of tape 140 cooperatively pull the lower length 154 of the tape loop 144 away from the second window slidable window pane 48. The teeth 199 extending from the second lower connector arm 190 and engaging the lower length 154 of the tape loop 144 causes the laterally coupled mounting brackets 50 on the second slidable window pane 48 to slide to the left and to pull the second slidable window pane 48 from the closed position shown in FIG. 2 to the open position shown in FIG. 3. When the first and second slidable window panes 46, 48 arrive at the fully open position shown in FIG. 2, the first upper connector arm 160 and second lower connector arm 190 engage the first and second housing members 70, 100, respectively, and prevent further rotation of the motor 120 which then stalls and switches off. Optionally, an operator could switch off the motor 120 by the cab switch to partially open the window assembly 30.

To close the movable window panes 46, 48, the operator presses a switch in the cab (not shown). Referring to FIG. 3, the shaft 122 of the motor 120 drives the first gear 90 in a counterclockwise direction. The first gear 90, which is engaging the tape 140, pulls the lower length 154 of the tape loop 144 rightwardly and away from the second slidable window pane 48. The teeth 189 of the first lower connector arm 180 engaging the lower length 154 of the tape loop 144 cause the laterally coupled corresponding mounting brackets 50 to slide to the right thereby pulling the second slidable window pane 48 from the open position shown in FIG. 3 to the closed position shown in FIG. 2. Simultaneously, the second gear 110 is rotated in the counterclockwise direction by the pulling movement of the lower length 154 of the tape loop 144 in the rightwardly direction. The second gear 110 and lower tape length 154 cooperatively pull the upper length 153 of the tape loop 144 to the left and away from the first slidable window pane 46. The teeth 179 of the second upper connector arm 170 engaging the tape 140 causes the laterally coupled corresponding mounting brackets 50 to slide to the left and to pull the first slidable window pane 46 from the open position shown in FIG. 3 to the closed position shown in FIG. 2. When the seals 49 of the movable window panes 46, 48 engage or when the second upper connector arm 170 and the first lower connector arm 180 engage the central support arm 210 as shown in FIG. 2, further rotation of the motor 120 is prevented and the motor 120 stalls and rams off.

Advantageously, the power drive mechanism 60 is vertically adjustable relative the window assembly 30 during both assembly and during the pull/pull operation of the power window assembly 24 as enabled by the upper end portions 164, 174, 184, 194 of the connector arms 160, 170, 180, 190 being slip-fittedly inserted in the pockets 57 of the mounting brackets 50. Thus, the connector arms 160, 170, 180, 190 are free to float vertically up and down within the pockets 57 of the mounting brackets 50 and also are free to pivot forward or rearward during assembly and operation of the power window assembly 24. It will be appreciated that the single channel member 62 slidably guides the lateral movement of all of the connector arms 160, 170, 180, 190 and prevents vertical removal of the connector arms 160, 170, 180, 190 relative the power drive mechanism 60 once the power drive mechanism 60 is mounted to the vehicle structure 21.

It be appreciated that the upper and lower lengths 153, 154 of the tape loop 144 are vertically aligned in the assembled condition such that the entire power drive mechanism 60 is longitudinally narrow while still providing a continuous tape loop 144 system which allows packaging in longitudinally narrow locations. It will be appreciated that this packaging advantage is enabled by having the width of the tape loop 144 oriented normal to the slidable window panes 46, 48 and by providing lower connector arms 180, 190 having laterally extending pass slots 201 which slidably engage the upper length 153 while not interfering with lateral movement thereof. In essence, the lower connector arms 180, 190 extend vertically downward through the upper length 153 of the tape loop 144 for engaging the lower length 154 of tape loop 144 while not interfering with the movement of the upper length 153 of the tape loop 144. It will further be appreciated that the use of the length of tape 140 formed into a continuous loop 144 enables the tape 140 to constantly be in tension with any slight slack removed by the tensioner member 130. In addition, the provision of the continuous tape loop 144 in combination with two connector members 160, 170, 180, 190 on each of the slidable window panes 46, 48 enables a pull/pull operation which simultaneously pulls both window panes 46, 48 open and pulls both window panes 46, 48 closed by the same amount.

In addition, the pull/pull system having a tape 140 continually in tension greatly deters vehicle theft when compared with the manually slidable windows or a window that pushes open. For example, if the slidable window panes on a manual or push open system are left in a partially open or cracked open position, the window can be further pushed open when the vehicle 20 is unattended to gain access to the vehicle interior. In contrast, it is extremely difficult to move the partially open slidable window panes 46, 48 on the pull/pull system unless the motor 120 is activated or the power drive mechanism 60 is partially disassembled.

Advantageously, the tape 140 is located entirely beneath the channel member 62 and an elongated track or sheath is not required to guide the tape 140 or to keep the tape 140 from buckling since the power drive mechanism 60 is a pull/pull system which constantly applies tension on the tape loop 144 for pulling the slidable window panes 46, 48 between the closed and open positions.

It will be appreciated that the present invention provides a power drive mechanism 60 which has a greatly reduced number of fasteners over the prior art. The entire power drive mechanism 60 snap-fits or slip-fits together, with the only exception of three fasteners 83 for connection of the electric motor to the first housing member 70.

It will be understood that a person skilled in the art may make modifications to the embodiments shown herein within the scope and intent of the claims.

Although the preferred embodiment shows the motor 120 and casing 124 riveted to the first housing member 70, it will be appreciated that many attachment methods may be used, including a snap-fitted attachment method which would advantageously eliminate motor fasteners 83 from the power drive mechanism 60. Although the power drive mechanism 60 includes a central support arm 210, none or more than one support arm 210 may be provided with the power drive mechanism 60 depending on the lateral length of the window assembly 30.

Advantageously, the width of the entire power drive mechanism 60 may be easily modified to use with any lateral length of window assembly 30 simply by changing the lateral length of the channel member 62 and the tape 140 without otherwise modifying any of the other components. It will also be appreciated that the power drive mechanism 60 could be mounted on the outboard side of the window assembly 30 with the slidable and stationary window panes 46, 48, 40, 42 switching inboard and outboard channels 34, 36 in the frame 32. It will further be appreciated that the lateral locations of the first and second housing members 70, 100 could be swapped. It will further be appreciated that the power drive mechanism 60 can be used for powered operation of any laterally slidable window panes within any type of vehicle.

Figure 11:
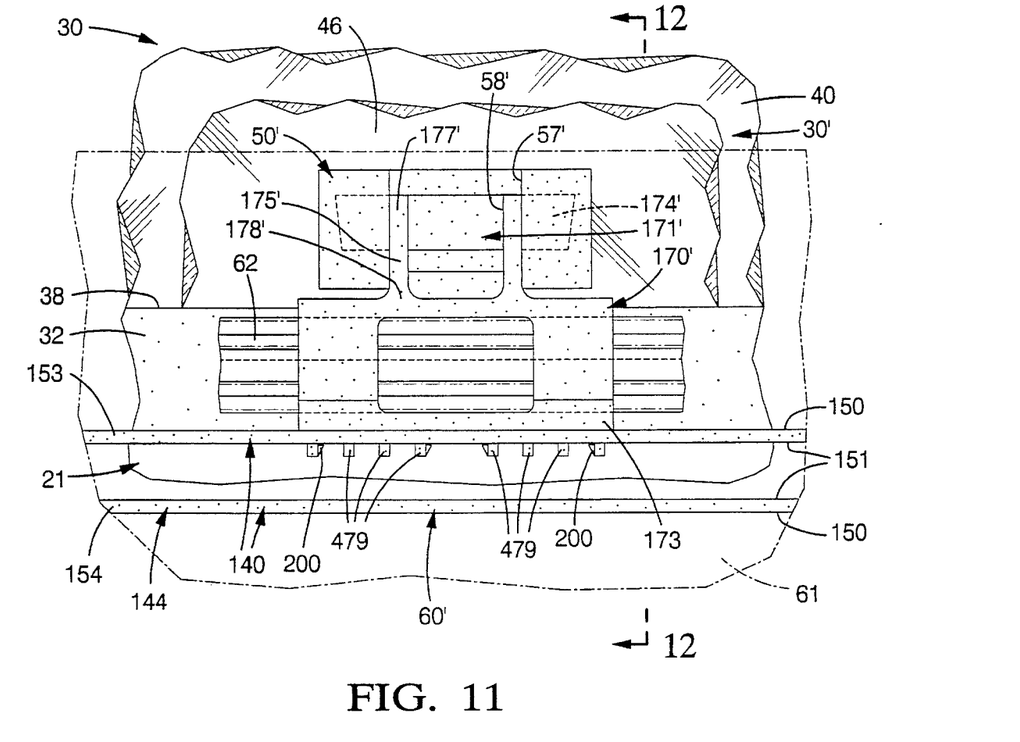
FIG. 11 is a view similar to FIG. 8, but showing an alternate embodiment of an upper end portion of the upper connector arm.
Figure 12:
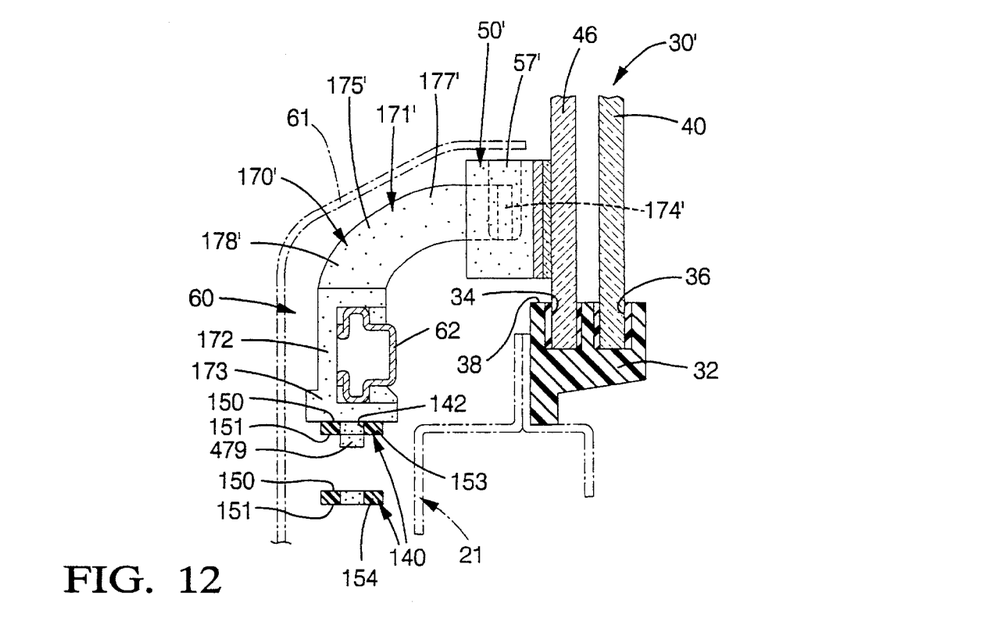
FIG. 12 is a view taken along line 12—12 of FIG. 11.

FIGS. 11 and 12 show an alternate embodiment of the invention similar to the embodiment shown in FIGS. 1–10, but showing an alternate embodiment of the upper end portions 164, 174, 184, 194 of the connector arms 160, 170, 180, 190. Similar components in FIGS. 11 and 12 are denoted by the same numerals as the embodiment in FIGS. 1–10 and have the same description. As exemplified by the second upper connector arm 170' shown in FIGS. 11 and 12, the generally T-shaped upper portion 171' of the upper connector arm 170' includes a laterally extending tapered dovetail-shaped upper end portion 174' which is planar in a vertical direction. The dovetail-shaped upper end portion 174' replaces the rod-shaped upper end portions 164, 174, 184, 194 shown in FIGS. 1–10. The dovetail-shaped upper end portion 174' extends laterally outward from the neck portion 175' and has a center integrally connected to an upper end 177' of the neck portion 175' When the connector arm 170' is assembled to a mounting bracket 50', the dovetail-shaped upper end portion 174' is seated in the pocket 57' of the mounting bracket 50' and is vertically slidable relative to the mounting bracket 50' to provide a vertically adjustable floating connection between the window assembly 30' and the power drive mechanism 60'.

Figure 13:
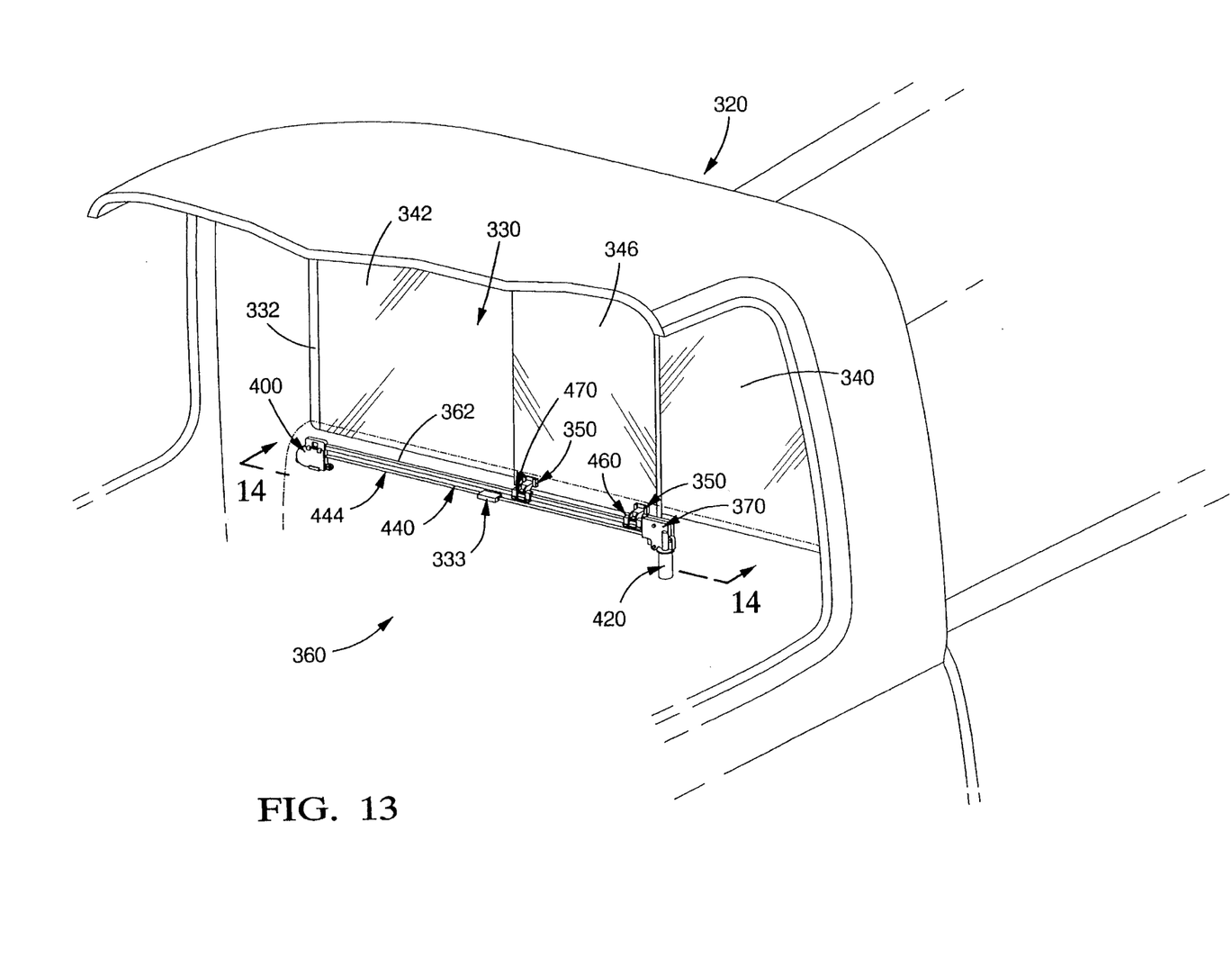
FIG. 13 is a view similar to FIG. 1, but showing another alternate embodiment of the invention adapted for a window assembly having one slidable window pane.
Figure 14:
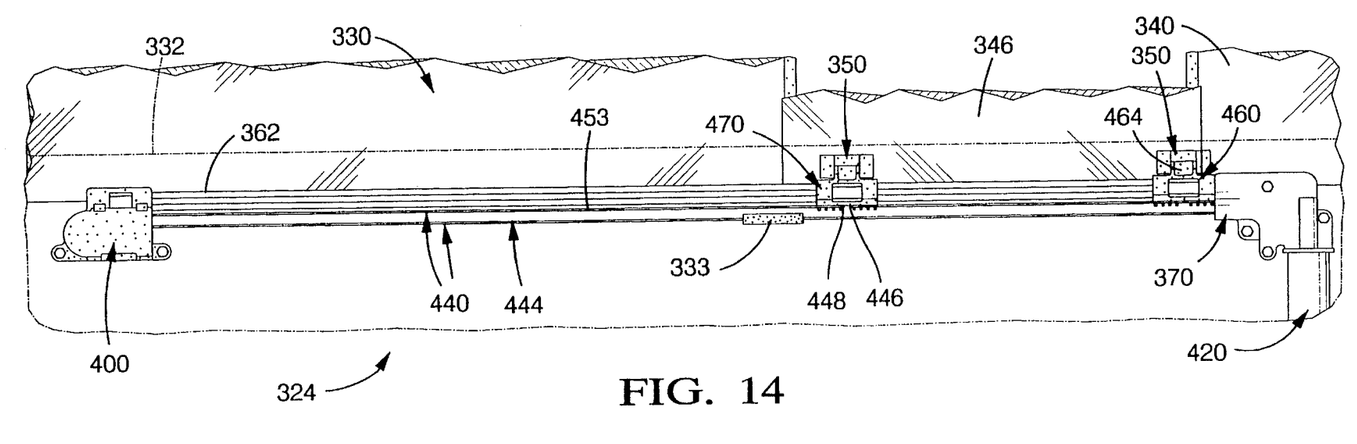
FIG. 14 is a view similar to FIG. 2, but showing the alternate embodiment of FIG. 13 with the window assembly in the closed position.
Figure 15:
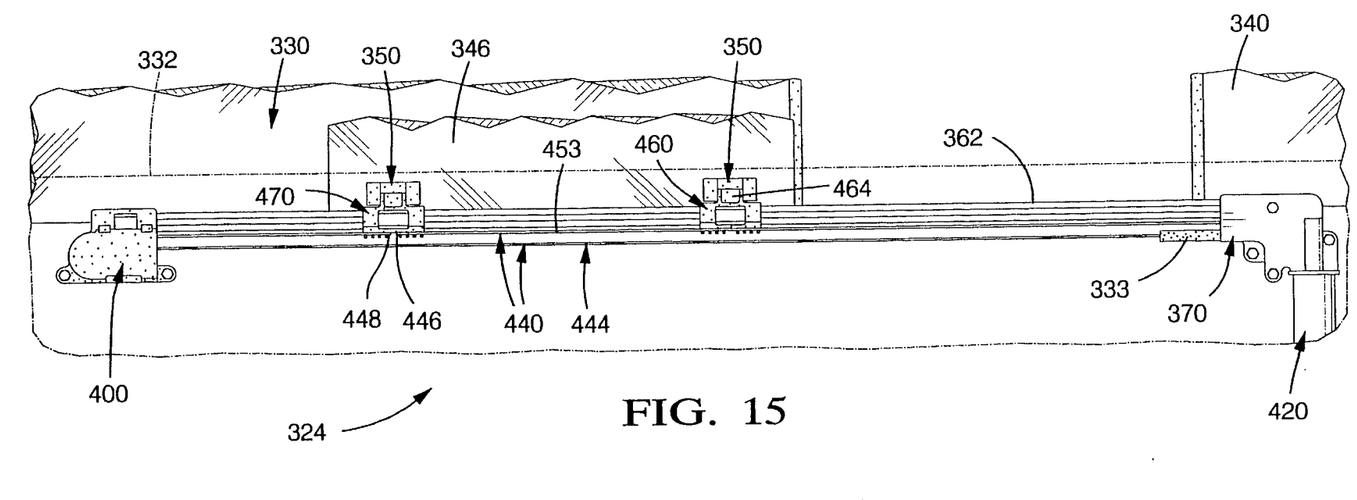
FIG. 15 is a view similar to FIG. 14, but showing the window assembly in the open position.

Advantageously, the present invention is easily modified to provide a power window assembly 324 for use with a window assembly 330 having a slidable window pane 346. FIGS. 13–15 show another alternate embodiment of a power window assembly 324 in which a vehicle 320 includes a window assembly 330 having a single central slidable window pane 346 and first and second stationary window panes 340, 342 conventionally mounted in a frame 332 for attachment to the vehicle 320. The slidable window pane 346 is movable between a closed position shown in FIG. 14 and an open position shown in FIG. 15. The window assembly 330 includes mounting brackets 350 rigidly attached to the slidable window pane 346 and having a description similar to the mounting brackets 50 shown in FIGS. 1–10.

A power drive mechanism 360 includes a channel member 362 extending between first and second housing members 370, 400, a first gear (not shown) rotatably supported on the first housing member 370 and driven by an electric motor 420, a length of tape 440 having a plurality of slots (not shown) therein and formed into a tape loop 444 and rotatively coupling the first gear to a second gear (not shown) supported in the second housing member 400, a stop member 333 connected to the tape 440, and first and second floating upper connector arms 460, 470 for adjustably connecting find laterally coupling the tape 440 of the power drive mechanism 360 to the mounting brackets 350 of the window assembly 330.

The first housing member 370, second housing member 400, channel member 362, first gear, second gear, and tape loop 444 all have descriptions similar to the corresponding parts in FIGS. 1–10. Accordingly, the first and second upper connector arms 460, 470 are adjustably connected to the mounting brackets 350 on opposing lateral sides of the slidable window pane 346 and have a description similar to the upper connector arms 160, 170 shown in FIGS. 1–10 including downwardly depending teeth 469, 479 for connecting to an upper length 453 of the tape 440. The stop member 333 has a laterally extending integral hinge (not shown) and is adapted to snap together when folded in half along the hinge. The stop member 333 has teeth (not shown) adapted to snap onto the tape 440 when folded along the hinge. The stop member 333 is snapped onto and secured in position on a lower length 454 of the tape loop 444 for stalling the motor 420 when the slidable window pane 346 is in the open position, as described further hereinafter.

Since the lower connector arms 180, 190 shown in the embodiment in FIGS. 1–10 are eliminated when using a slidable window pane 346, the length of tape 440 is held in the tape loop 444 by snapping a first end 446 of the tape 440 and a second end 448 of the tape loop 440 onto the downwardly depending teeth 479 of a lower end portion 478 of the second upper connector arm 470 in a similar manner as attachment of the tape 140 to the first lower connector arm 180 as shown in FIG. 6.

The power window assembly 324 is cooperatively provided by connection of the window assembly 330 and the power drive mechanism 360 which are each separately and independently assembled apart from the vehicle 320 in a manner similar to that described with reference to FIGS. 1–10. It will be appreciated that assembly of the power drive mechanism 360 is slightly modified in that the stop member 333 is attached to the lower length 454 of the tape loop 444 and the ends 446, 448 of tape loop 444 are connected to the second upper connector member 470. It will further be appreciated that assembly of the power drive mechanism 360 to the window assembly 330 is slightly modified in that the first and second upper connector arms 460, 470 are vertically adjustably and pivotally connected to the mounting brackets 350 similar to the upper connector arms 160, 170 of FIGS. 1–10, but that the lower connector arms 180, 190 are eliminated.

Referring to FIGS. 14 and 15, the power drive mechanism 360 pulls open and pulls closed the slidable window pane 346 as follows. To open the movable window pane 346, the operator pushes a switch in the cab, not shown, which is connected to the reversible electric motor 420 and the electric motor 420 drives the first gear in a counterclockwise direction. The first gear which is engaging the tape 440 pulls the lower length 454 of the tape loop 444 towards the slidable window pane 346 which in turn rotates the second gear in the counterclockwise direction and pulls the upper length 453 of the tape loop 444 leftwardly and away from the slidable window pane 346. The teeth 479 extending from the second upper connector arm 470 and engaging the tape 440 causes the laterally coupled respective mounting bracket 350 to slide to the left and to pull the first movable window pane 346 from the closed position shown in FIG. 14 to the open position shown in FIG. 15. When the slidable window pane 346 arrives at the fully open position shown in FIG. 2, the stop member 333 has been pulled to the right and engages the first housing member 370, thus preventing further rotation of the motor 420 which then stalls and switches off. It will be appreciated that the stop member 333 may be eliminated and that the second connector arm 470 may instead engage the second housing member 400 to stop the motor 420 by moving the second housing member 400 to the right. It will further be appreciated that the stop member 333 may be moved further rightwardly on the lower length 454 of the tape loop 444 to limit the amount of opening of the slidable window pane 346 to less than that shown in FIG. 15, if desired.

To close the slidable window pane 346, the operator presses a switch in the cab (not shown). Referring to FIG. 3, the motor 420 drives the first gear in a clockwise direction. The first gear, which is engaging the tape 440, pulls the upper length 453 of the tape loop 444 rightwardly and away from the slidable window pane 346. The teeth 469 of the first upper connector arm 460 engaging the upper length 453 of the tape loop 444 cause the laterally coupled corresponding mounting brackets 350 to slide to the right thereby pulling the slidable window pane 346 from the open position shown in FIG. 15 to the closed position shown in FIG. 14. When the first upper connector arm 460 engages the first housing member 370 as shown in FIG. 14, further rotation of the motor 420 is prevented and the motor 420 stalls and turns off.

It will be appreciated that the embodiment shown in FIGS. 13–15 may be modified by swapping the location of the first and second housing members 370, 400 such that the motor 420 is located proximate the left side of the slidable window pane 346. It will further be appreciated that the ends 446, 448 of the tape 440 may alternately be connected to the first upper connector arm 460 or the stop member 333.

Advantageously and similar to the embodiments shown in FIGS. 1–10, the power drive mechanism 360 is vertically adjustable and longitudinally pivotal relative the window assembly 330 during both assembly and during the pull/pull operation of the power window assembly 324 as enabled by rod-shaped upper end portions 464, 474 of the connector arms 460, 470 being slip-fittedly inserted in the pockets 357 of the mounting brackets 350.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. A power window assembly in a vehicle comprising:
    a slidable window pane mounted to the vehicle for movement in a first lateral direction to an open position and in a second lateral direction to a closed position;
    first and second mounting brackets securely attached to the window pane and each having a pocket therein; and
    a power drive mechanism for selectively moving the window pane between the closed position and the open position, the power drive mechanism including first and second connector arms each laterally coupled to the first and second mounting brackets, respectively, the first and second connector arms each having; an upper portion seated in the respective pockets of the first and second mounting brackets by slip-fitted insertion therein and being vertically slidable relative the pockets to adjustably connect the window pane to the power drive mechanism;
    whereby the connector arms of the power drive mechanism vertically float relative the window pane during movement of the window pane between the open position and the closed position.

2. The power window assembly of claim 1 wherein the power drive mechanism selectively pulls one of the connector arms in the first lateral direction for pulling the window pane towards the open position and pulls the other of the connector arms in the second lateral direction for pulling the window pane towards the closed position.

3. The power window assembly of claim 1 wherein the upper portions of the first and second connector arms are each adapted to be pivotally seated in the pockets of the first and second mounting brackets, respectively, whereby the power drive mechanism is pivotally connected to the window pane.

4. The power window assembly of claim 1 wherein the upper portions of the first and second connector arms each include a laterally extending rod-shaped portion pivotally seated in the pockets of the mounting brackets to pivotally connect the first and second connector arms to the window pane whereby the power drive mechanism is pivotally connected to the window pane.

5. The power window assembly of claim 1 wherein the upper portions of the first and second connector arms each include a laterally extending, vertically planar, tapered dovetail-shaped upper end portion seated in the pockets of the mounting brackets and vertically slidable relative the pockets when inserted therein.

6. The power window assembly of claim 1 wherein the power drive mechanism includes a motor and a length of tape having a plurality of slots therein, the length of tape being formed into a loop and coupled to the motor for selective movement thereby.

7. The power window assembly of claim 6 wherein the connector arms each include an outwardly and downwardly depending portion adapted for engaging the slots on the tape and being driven by the tape in the first and second lateral directions.

8. The power window assembly of claim 7 wherein the tape includes a first end and a second end and wherein the outwardly and downwardly depending portion of one of the connector arms engages the first and second ends of the tape to maintain the tape in the loop.

9. A power window assembly in a vehicle comprising:
first and second slidable window panes for movement in opposing lateral directions away from each other to an open position and towards each other to a closed position;
a first pair of mounting brackets securely attached to the first window pane and a second pair of mounting brackets securely attached to the second window pane, each of the mounting brackets having a pocket therein; and
a power drive mechanism for selectively moving the window panes between the closed position and the open position, the power drive mechanism including a first pair of connector arms laterally coupled to the first pair of mounting brackets and a second pair of connector arms laterally coupled to the second pair of mounting brackets, the connector arms each having upper portions seated in the pockets of the respective mounting brackets by slip-fitted insertion therein and being vertically slidable relative the pockets to adjustably connect the window panes to the power drive mechanism;
whereby the connector arms of the power drive mechanism vertically float relative the window panes during movement of the window panes between the open and closed positions.

10. The power window assembly of claim 9 wherein the power drive mechanism selectively pulls one of the connector arms of the first pair and one of the connector arms of the second pair away from each other to pull the window panes towards the open position and selectively pulls the other of the connector arms of the first pair ,and the other of the connector arms of the second pair towards each other for pulling the window panes towards the closed position.

11. The power window assembly of claim 9 wherein the upper portions of the first and second pairs of connector arms are each adapted to be pivotally seated in the pockets of the first and second pairs of mounting brackets, respectively, whereby the power drive mechanism is pivotally connected to the window panes.

12. The power window assembly of claim 9 wherein the upper portions of the first and second pairs of connector arms each include a laterally extending rod-shaped portion pivotally seated in the pockets of the respective first and second pairs of mounting brackets to pivotally connect the power drive mechanism to the window panes.

13. The power window assembly of claim 9 wherein the upper portions of the first and second pairs of connector arms each include a laterally extending, vertically planar, tapered dovetail-shaped upper end portion seated in the pockets of the respective first and second pairs Of mounting brackets and vertically slidable relative the pockets when inserted therein.

14. The power window assembly of claim 9 wherein the power drive mechanism includes a motor and a length of tape having a plurality of slots therein, the length of tape being formed into a loop and coupled to the motor for selective movement thereby, the loop having a laterally elongated upper length and a laterally elongated lower length spaced beneath and parallel to the upper length.

15. The power window assembly of claim 14 wherein the window panes extend in a vertical direction and wherein the tape has a tape width oriented normal to the vertical direction.

16. The power window assembly of claim 14 wherein one of the pairs of the connector arms is adapted for engaging the slots on the upper length of the loop and the other of the pairs of connector arms is adapted for engaging the slots on the lower length of the loop.

17. The power window assembly of claim 16 wherein the other of the pairs of connector arms adapted for engaging the lower length of the loop each have a laterally extending slot for slidably receiving the upper length of the loop therethrough whereby the upper length of the loop moves freely relative the slots.

18. The power window assembly of claim 14 wherein the tape includes a first end and a second end and wherein one of the connector arms engages the first and second ends of the tape to maintain the tape in the loop.

19. A power window assembly in a vehicle comprising:
a slidable window pane slidably mounted to the vehicle for movement in a first lateral direction to an open position and in a second lateral direction to a closed position;
first and second housing members mounted to the vehicle and laterally spaced apart from each other, the first and second housing members each having a laterally extending channelled portion therein;
a laterally elongated channel member having a first end adapted for slip-fitted insertion into the channelled portion of the first housing member and having a second end adapted for slip-fitted insertion into the channelled portion of the second housing member;
a first gear rotatably supported on the first housing member;
a second gear rotatably supported on the second housing member;
a reversible electric motor mounted to the first housing member and engaging the first gear for selectively rotating the first gear in a first direction and a second direction;

a length of tape spaced apart beneath the channel and having a plurality of slots therein, the tape being formed into a loop and extending around the first and second gears, the loop including a laterally elongated upper length and a laterally elongated lower length disposed beneath the upper length;

first and second mounting brackets securely attached to the window pane and each having a pocket therein; and first and second connector arms each having a laterally extending channelled portion extending entirely therethrough and adapted for slip-fitted connection to the channel member and laterally slidable relative the channel member when connected thereto, the connector arms being laterally coupled to the respective mounting brackets and each having an upper portion seated in the pockets of the respective mounting brackets by slip-fitted insertion therein and being vertically slidable relative to the pockets, the connector arms each having a lower end portion spaced beneath the channelled portions of the connector arms and adapted for engaging the slots of the upper length of the loop;

whereby rotation of the first gear in the first direction pulls the first connector arm in the first lateral direction to pull the window pane to the open position and rotation of the first gear in the second direction pulls the second connector arm in the second lateral direction to pull the window pane to the closed position and whereby the connector arms of the power drive mechanism vertically float in the pocket relative the window pane during movement of the window pane between the open and closed positions.

* * * * *